July 6, 1937. R. JARDINE 2,086,420
ENGINE VALVE
Filed Aug. 28, 1935
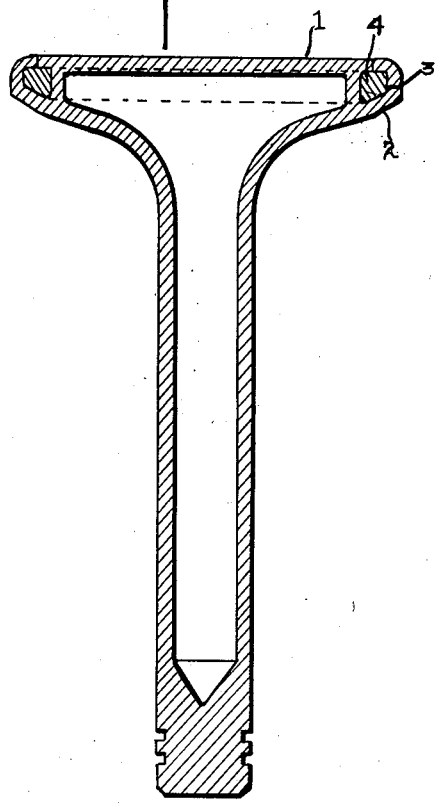
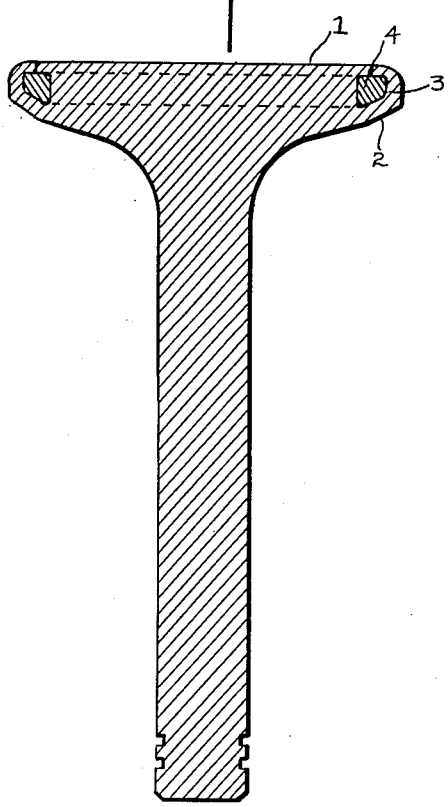
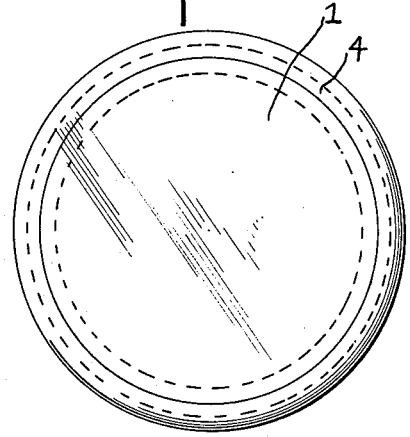
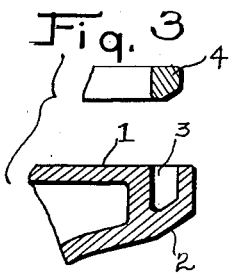
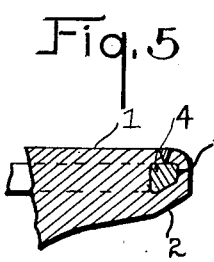
Robert Jardine
Inventor
By Watts T. Estabrook
Attorney Patented July 6, 1937

2,086,420

UNITED STATES PATENT OFFICE 2,086,420

ENGINE VALVE

Robert Jardine, Detroit, Mich., assignor, by mesne assignments, to Eaton Manufacturing Company, Cleveland, Ohio, a corporation of Ohio Application August 28, 1935, Serial No. 38,276

3 Claims. (Cl. 123—188)

My invention relates to poppet valves for internal combustion engines, particularly the valves used in sealing exhaust ports.

Valves used to seal the exhaust ports of internal combustion engines have a tendency to become unequally heated due to heat absorption by that side of the head where the leakage of hot gases takes place when the head of the valve breaks contact with the cylinder seat either through valve head distortion or cylinder seat distortion.

Valves embodying my invention more readily conduct the heat circumferentially around the valve head in two directions which results in more rapid heat transfer to other parts of the head, thereby contributing greatly to a more uniform temperature of the head with no exceedingly hot spots which might cause preignition of the incoming or highly compressed gases. This rapid transfer of heat from the point of application results in less warpage or distortion of the valve itself.

One of the objects of my invention is to provide a valve having as nearly as possible uniform temperature over the entire surface of the head.

Another object of my invention is to provide a valve which will more nearly maintain its shape while operating under severe conditions.

Other objects of my invention will be apparent from the following description and upon reference to the accompanying drawing, illustrating certain preferred embodiments of my invention in which Fig. 1 is a cross-section view of a hollow stem type of valve;

Fig. 2 is a top plan view showing the invention applied to a valve stem and indicated by dotted lines;

Fig. 3 is a detailed sectional view showing a valve head and insert prior to assembling;

Fig. 4 is a vertical transverse sectional view of a solid stem type of valve; and Fig. 5 is a detailed sectional view of a slightly modified arrangement.

The valve shown in Fig. 1, is a preferred form of my invention. The hollow interior permits the use of a cooling medium that will become liquid at engine operating temperatures. This liquid wets the surface of the interior walls of the valve and rapidly conducting the heat from the head of the valve to the stem portion where the heat is quickly given up to the atmosphere by way of the cylinder or to the cylinder cooling fluid if the engine is of the liquid cooled type.

When the heat in the valve head is not distributed equally over the entire surface of the valve head 1, the valve seat 2 may distort and not contact properly with its seat. This causes a loss of compression and therefore of power in the engine and also tends to destroy the surface of the valve seat by the hot gases traveling over the valve seat at high velocity.

To distribute the heat around the valve head, I form an annular recess 3 in the valve head 1, and tightly fit into the recess a ring or annulus 4, this ring or annulus being made from material having relatively high heat conductivity.

After the annulus 4 has been fitted to the recess 3, I close up the recess over the annulus 4 by subjecting the head to a forging, welding, or other operation, to enclose the annulus 4 within the recess 3. This annulus can be brazed or welded or otherwise brought into intimate contact with the walls of the recess if so desired. It may be desirable when the annulus 4 is made of rapid heat conducting material having a thermal expansion greater than the material used in the valve head to not entirely close the annulus within the recess. In such an instance the valve head could be pressed, forged or otherwise manipulated to substantially enclose the annulus 4 as indicated in Fig. 5, and then this gap could be filled with a suitable solder which would function with the head and annulus and permit of the expansion and contraction of the head and annulus and dissipating the heat. If a pressing operation is employed to confine the annulus within the recess, this would allow for expansion of the annulus and the substantially closed recess would open slightly to compensate for the expansion of the material of the annulus.

This annulus being of material having relatively high heat conductivity such as copper, conducts the heat in two directions circumferentially around the valve head.

By conducting the heat circumferentially around the valve head by reason of the rapid heat conduction in the material of annulus 4, the valve head is not so likely to attain higher temperature on one side than on the other and distortion of the valve head is therefore eliminated, and the valve will seat in a more nearly perfect manner and prevent loss of compression and loss of power.

The necessity to eliminate the hot spots on one side of the seat of the valve and to reduce the effects of heat and erosion has been a problem confronting the engineers. By the present invention this condition has been materially cured. For instance, employing a valve in which the hollow head and stem are cooled by a medium such as sodium, as illustrated in Fig. 1, the margin between the sodium cooled aperture and seat will become much hotter than the rest of the valve especially on one side. If the valve was uniformly hot all over in the form of a red hot circle around the sodium cooled center, the sodium would draw heat from the entire circumference and keep the average temperature of this red hot ring down considerably. Even if it did not draw the heat more rapidly from the entire circumference, but by providing the annulus of high heat conductivity such as copper, the heat is taken from this hottest point and distributed around the entire circumference, the average temperature will be lower than the hot side of the valve, thereby lowering the temperature on the hot side of the valve and eliminating the forming of hot spots on one side of the seat of the valve.

The hot gases coming in contact with the seat portion of the valve tends to cause the valve to expand or become distorted, thereby breaking contact between the seat of the valve and its valve seat because the expansion of a wedge-shaped piece forces it upwards and away from its seat. Therefore, it is of great importance that the heat be taken away from this hot spot as quickly as possible, and by so doing will considerably lengthen the life of the valve and without serious need of attention and complete destruction of the valve.

The rapid dissipation of the heat will not only keep the valve from warping away from its seat, but it will keep the seat of the valve in a cooler condition, and in this cold condition wear resistance or resistance to erosion, which is the wear that takes place by the rapid passage of the gas through any narrow aperture under explosion or working pressures in the engine, will be lessened considerably, since it is quite commonly known that gas over red hot surfaces will result in much more rapid wear than would be the case were it passed over these same surfaces of the same material but with the surfaces in a much cooler condition.

While the preferred construction embodies control means for drawing heat away from the center of the head in the form of a hollow stem filled with material of high heat conductivity, stems of the solid type may be used depending upon the heat conducting properties, or heat radiating properties of the stem materials for the removal or withdrawing of heat from the head.

Having thus described my invention, what I claim as new therein and desire to secure by Letters Patent is:

1. A valve for internal combustion engines having a head and stem portion, the head portion having a seat on one side near its outer periphery and a recess formed therein on the other side thereof opposite the seat, and an annulus of material having relatively high heat conductivity in said recess and confined therein for dissipating the heat from said seat.

2. A valve for internal combustion engines having a head and stem portion, the head portion having near its outer periphery a seat on one side thereof and an annulus of material of relatively high heat conductivity embedded in said head portion near its outer periphery and opposite said seat for dissipating the heat from said seat.

3. A valve for internal combustion engines, including a hollow head and stem portion having a cooling medium therein, the head portion having near its outer periphery a seat on one side thereof and a recess formed therein on the other side opposite the seat, and an annulus of material of relatively high heat conductivity confined in said recess, said annulus and cooling medium dissipating the heat from said seat and head portion.

ROBERT JARDINE.